United States Patent
Tang et al.

(10) Patent No.: US 10,754,951 B1
(45) Date of Patent: Aug. 25, 2020

(54) DYNAMIC EVALUATION OF EXECUTABLE FILES IN A LIGHTWEIGHT EXECUTOR

(71) Applicant: Trend Micro Incorporated, Tokyo (JP)

(72) Inventors: Jie Tang, Nanjing (CN); Weimin Wu, Nanjing (CN); Kai Yu, Nanjing (CN); Chengguo Zhang, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 187 days.

(21) Appl. No.: 16/009,801

(22) Filed: Jun. 15, 2018

(51) Int. Cl.
| | |
|---|---|
| H04L 29/06 | (2006.01) |
| G06F 21/56 | (2013.01) |
| G06F 21/52 | (2013.01) |
| G06F 21/53 | (2013.01) |

(52) U.S. Cl.
CPC ............ *G06F 21/566* (2013.01); *G06F 21/52* (2013.01); *G06F 21/53* (2013.01); *G06F 2221/033* (2013.01)

(58) Field of Classification Search
CPC ................................ G06F 21/566; G06F 21/52
See application file for complete search history.

(56) References Cited

U.S. PATENT DOCUMENTS

| | | | | |
|---|---|---|---|---|
| 7,647,636 | B2 * | 1/2010 | Polyakov | G06F 21/566 713/187 |
| 8,555,386 | B1 * | 10/2013 | Belov | G06F 21/566 726/22 |
| 8,990,939 | B2 | 3/2015 | Staniford | |
| 9,071,638 | B1 | 6/2015 | Aziz | |
| 9,106,694 | B2 | 8/2015 | Aziz et al. | |
| 9,159,035 | B1 | 10/2015 | Ismael et al. | |
| 9,165,142 | B1 | 10/2015 | Sanders et al. | |
| 9,171,160 | B2 | 10/2015 | Vincent et al. | |
| 9,917,855 | B1 | 3/2018 | Li et al. | |
| 2008/0016339 | A1 | 1/2008 | Shukla | |
| 2011/0078790 | A1 | 3/2011 | Fazunenko et al. | |

(Continued)

OTHER PUBLICATIONS

Control flow graph—from Wikipedia, the free encyclopedia, 4 sheets [retrieved on Nov. 2, 2015], retrieved from the internet: https://en.wikipedia.org/wiki/Control_flow_graph.

(Continued)

*Primary Examiner* — Mohammad A Siddiqi
(74) *Attorney, Agent, or Firm* — Okamoto & Benedicto LLP

(57) ABSTRACT

Executable files are evaluated for malware in one or more lightweight executors, such as lightweight executor processes. An executable file is loaded and executed in a lightweight executor. Instructions in an execution path of the executable file are executed. Instructions in another execution path of the executable file are executed in another lightweight executor when a conditional branch instruction in an execution path has a suspicious condition. A fake kernel that mimics a real operating system kernel receives system calls, and responds to the system calls without servicing them in a way the real operating system kernel would. Runtime behavior of the executable file is observed for malware behavior. A response action, such as preventing the executable file from subsequently executing in a computer, is performed when the executable file is detected to be malware.

8 Claims, 8 Drawing Sheets

(56) References Cited

U.S. PATENT DOCUMENTS

| | | |
|---|---|---|
| 2013/0117006 A1 | 5/2013 | Varghese et al. |
| 2014/0181976 A1* | 6/2014 | Snow .................. G06F 21/53 |
| | | 726/23 |
| 2014/0380474 A1 | 12/2014 | Paithane et al. |
| 2015/0180883 A1 | 6/2015 | Aktas et al. |
| 2015/0309813 A1 | 10/2015 | Patel |
| 2016/0275000 A1 | 9/2016 | Sharma |
| 2017/0069214 A1* | 3/2017 | Dupray .............. G08G 5/0021 |
| 2017/0177868 A1* | 6/2017 | Hay .................. G06F 21/565 |
| 2017/0251003 A1 | 8/2017 | Rostami-Hesarsorkh et al. |

OTHER PUBLICATIONS

The JPC Project—the difference between Virtualization and Emulation, 3 sheet [retrieved on Feb. 24, 2016], retrieved from the internet: http://jpc.sourceforge.net/oldsite/Emulation.html.
FireEye White Paper—Advantage FireEye: Debunking the Myth of Sandbox Security, 2013, 6 sheets.

\* cited by examiner

US 10,754,951 B1

DYNAMIC EVALUATION OF EXECUTABLE FILES IN A LIGHTWEIGHT EXECUTOR

BACKGROUND OF THE INVENTION

1. Field of the Invention

The present invention relates generally to computer security, and more particularly but not exclusively to methods and systems for dynamic evaluation of executable files for malware.

2. Description of the Background Art

Malicious codes, which are also commonly-referred to as "malware", may be detected by static or dynamic evaluation. Static evaluation is performed on an executable file without executing the executable file. More particularly, static evaluation may involve scanning the executable file for content indicative of malware. With dynamic evaluation, the executable file is executed and the runtime behavior of the executable file is observed for behavior indicative of malware. Dynamic evaluation advantageously allows for detection of malware that has yet to be identified in the wild, and exposes malware behavior that only occurs during runtime.

Dynamic evaluation is typically performed in a system virtual machine, which is hosted on a host machine. The host machine typically hosts a plurality of virtual machines, each with its own sandbox in which the executable file is "detonated", i.e., run and observed. Each virtual machine has its own operating system, referred to as the "VM operating system." The VM operating system is separate from the host operating system of the host machine.

A problem with current dynamic evaluation solutions is that they are system heavy. That is, a typical dynamic evaluation solution requires a virtual machine that runs a full system environment. Another problem is that some malware include evasion techniques, which allow the malware to not exhibit malicious behavior unless executed in a particular system environment.

SUMMARY

In one embodiment, an executable file is loaded into a lightweight executor, such as a lightweight executor process. Instructions in an execution path of the executable file are executed in the lightweight executor. Instructions in another execution path of the executable file are executed in another lightweight executor when a conditional branch instruction in an execution path has a suspicious condition. A fake kernel that mimics a real operating system kernel receives system calls, and responds to the system calls without servicing them in a way the real operating system kernel would. Runtime behavior of the executable file is observed for malware behavior. A response action, such as preventing the executable file from subsequently executing in a computer, is performed when the executable file is detected to be malware.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
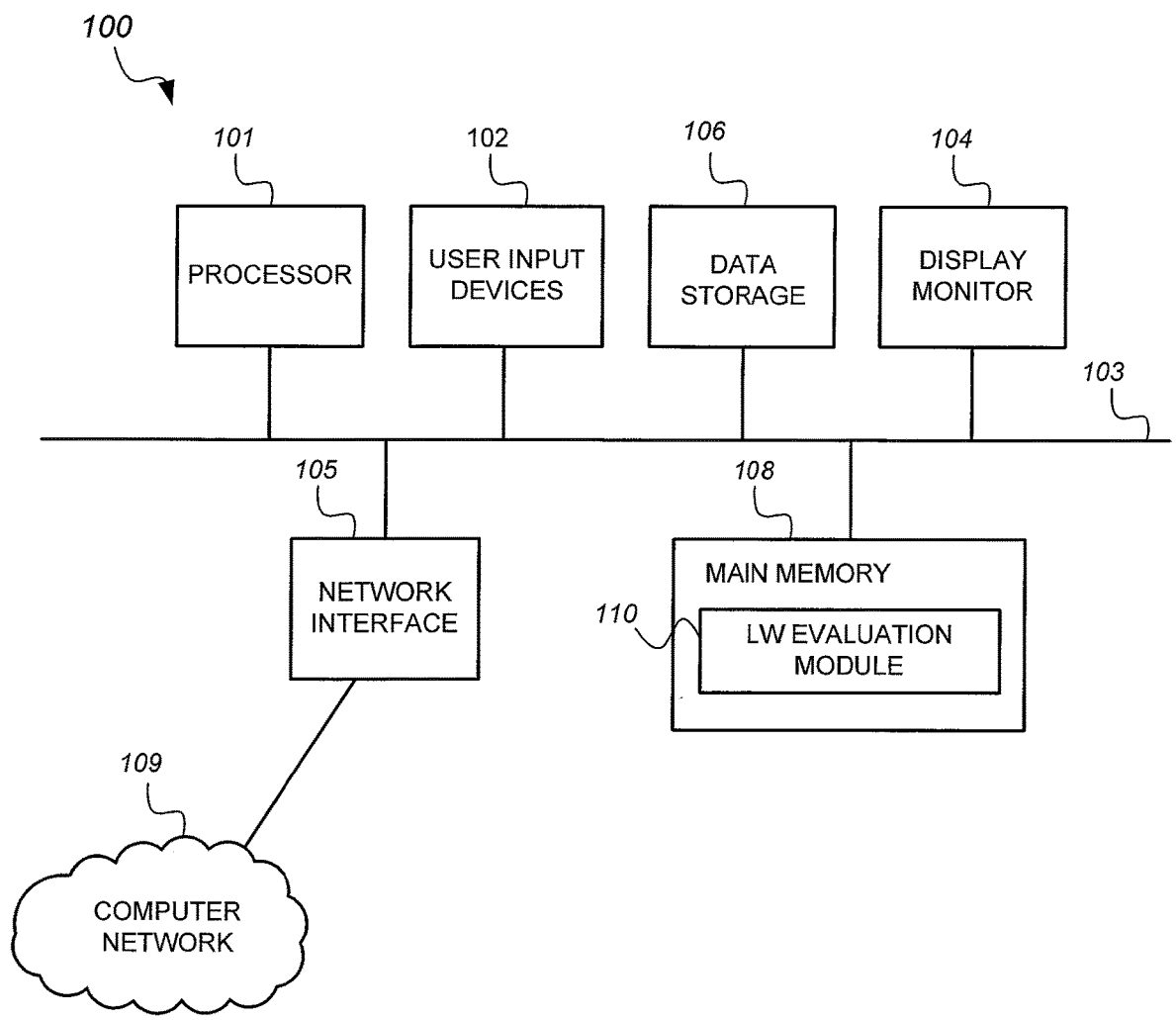
FIG. 1 is a logical diagram of a computer system in accordance with an embodiment of the present invention.

Referring now to FIG. 1, there is shown a logical diagram of a computer system 100 in accordance with an embodiment the present invention. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor), a computer network interface 105 (e.g., network adapter, modem), and a main memory 108 (e.g., random access memory). The computer system 100 may have fewer or more components to meet the needs of a particular application. The computer network interface 105 may be coupled to a computer network 109, which in this example includes the Internet.

The computer system 100 is a particular machine as programmed with one or more software modules, comprising instructions stored non-transitory in the main memory 108 for execution by the processor 101 to cause the computer system 100 to perform corresponding programmed steps. An article of manufacture may be embodied as computer-readable storage medium including instructions that when executed by the processor 101 cause the computer system 100 to be operable to perform the functions of the one or more software modules.

In the example of FIG. 1, the software modules comprise components of a lightweight evaluation module 110. In one embodiment, the lightweight evaluation module 110 is configured to dynamically evaluate executable files for malware. As can be appreciated, the lightweight evaluation module 110 may also be implemented in hardware (e.g., application-specific integrated circuit, field-programmable gate array, programmable logic device) or a combination of hardware and software depending on the needs of a particular computer security application.

The lightweight evaluation module 110 improves the functionality of the computer system 100 by improving the performance of the computer system 100 in evaluating executable files for malware. As will be more apparent below, the computer system 100, when programmed with the lightweight evaluation module 110, is able to evaluate more executable files and execution paths within a given time window and with less computing resources compared to previous dynamic evaluation solutions.

Figure 2:
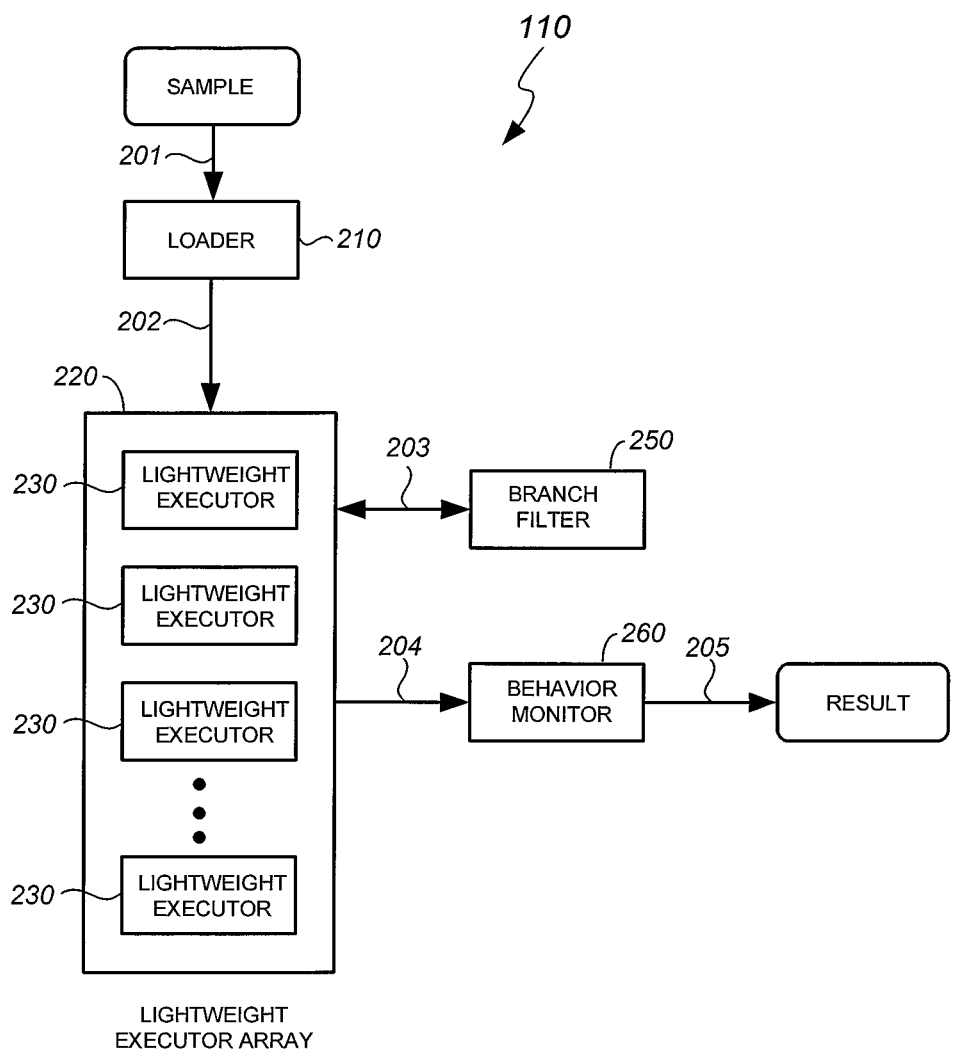
FIG. 2 is a logical diagram of a lightweight evaluation module for evaluating an executable file for malware in accordance with an embodiment of the present invention.

FIG. 2 is a logical diagram of a lightweight evaluation module 110 for evaluating an executable file for malware in accordance with an embodiment of the present invention. The lightweight evaluation module 110 may comprise a sample file loader 210, a lightweight executor array 220, a branch filter 250, and a behavior monitor 260.

The sample file loader 210 ("loader 210") may be configured to receive a sample file (see arrow 201) and load the contents of the sample file in a lightweight executor 230 (see arrow 202). The loader 210 may be configured to parse the sample file to identify its executable file type and load the contents of the sample file for execution in accordance with the standard loading protocol of its identified executable file type. For example, the loader 210 may parse the sample file to identify that the sample file is a Portable Executable (PE) file for the MICROSOFT WINDOWS operating system, and accordingly load the contents of the sample file in a lightweight executor 230 in accordance with the PE file standard loading protocol. The loader 210 may be configured to identify and load the contents of other types of executable files without detracting from the merits of the present invention.

A lightweight executor 230 is configured to provide an execution environment for executing the instructions of the sample file. This allows for observation of the behavior of the sample file at runtime. Generally speaking, a central processing unit (CPU) has two distinct execution modes: kernel-mode and user-mode. An application program's instructions run in user-mode. When the application program needs an operating system service, e.g., to open a file, the application program can make a system call and the corresponding operating system program runs in kernel mode.

In one embodiment, a lightweight executor 230 is implemented as a process by user-mode process emulation to run instructions of executable files being evaluated for malware. For example, a lightweight executor 230 may be implemented using the QEMU emulator in user-mode emulation, UNICORN CPU emulator, WINE compatibility layer, BOCHS emulator, or other suitable emulator without detracting from the merits of the present invention. User-mode process emulation allows a sample file designed for an operating system (also referred to herein as a "native operating system") to be executed as a process in another, different host operating system. As a particular example, an instance of a lightweight executor 230 may be a user-mode process that executes a PE file (which is designed to run on the WINDOWS operating system) by emulation in a host LINUX operating system.

Executing a sample file in a system virtual machine potentially exposes the system virtual machine to computer virus infection. Accordingly, a system virtual machine has to be reinitialized to a clean state after each evaluation run, which may take some time. On the other hand, a user-mode process is relatively easy to reinitialize.

In one embodiment, a lightweight executor 230 is configured to execute instructions in a single execution path of the sample file. When the lightweight executor 230 encounters a conditional branch instruction that leads to another execution path, but the condition to that execution path is not satisfied, the lightweight executor 230 is configured to consult with the branch filter 250 (see arrow 203) to determine whether or not to initiate creation of another lightweight executor 230 in which to execute instructions in the other execution path for evaluation. For example, when the branch filter 250 indicates that the other execution path needs to be traversed, the lightweight executor 230 may "fork" (i.e., make a copy of itself) another lightweight executor 230 for the other execution path.

The behavior monitor 260 may be configured to monitor the runtime behavior of the sample file (see arrow 204). That is, the behavior monitor 260 may observe operations of the sample file during execution of its instructions. In one embodiment, the behavior monitor 260 is configured to receive from the lightweight executor 230 application programming interface (API) calls and system calls made, the parameters of the API and system calls, objects targeted (e.g., uniform resource locators, files), and other operational data that are indicative of malware behavior. The behavior monitor 260 may employ heuristics and other dynamic evaluation techniques commonly-used in the computer security industry without detracting from the merits of the present invention.

The behavior monitor 260 may output the result of evaluating the runtime behavior of the sample file (see arrow 205). For example, the result may indicate whether the sample file is malware or is unknown (i.e., the evaluation is inconclusive). In response to detecting that the sample file is malware, the sample file may be prevented from subsequently being executed in a computer by putting the sample file in quarantine, deleting the sample file, alerting one or more computers about the sample file, entering the hash of the sample file in a file reputation database, blocking network traffic containing the sample file, etc.

Figure 3:
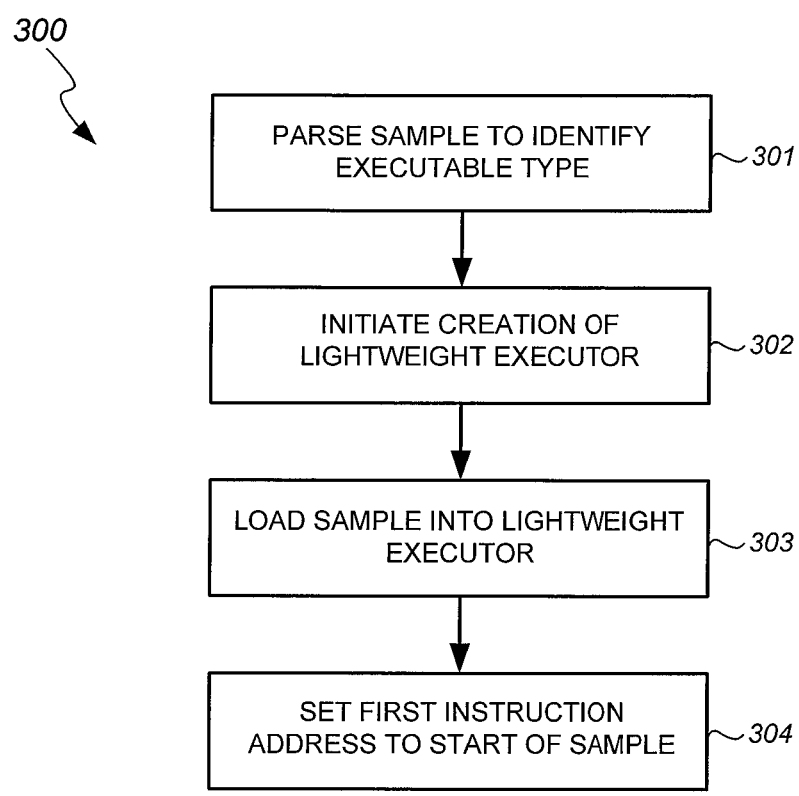
FIG. 3 is a flow diagram of a method of loading the contents of a sample file in a lightweight executor in accordance with an embodiment of the present invention.

FIG. 3 is a flow diagram of a method 300 of loading the contents of a sample file in a lightweight executor 230 in accordance with an embodiment of the present invention. The method 300 may be performed by the loader 210 to load a sample file in a lightweight executor 230.

In the example of FIG. 3, the loader 210 receives a sample file and parses the sample file to identify its executable file type (step 301). For example, the loader 210 may be configured to parse the sample file to determine whether the sample file is a WINDOWS operating system PE (Portable Executable) file, a LINUX operating system ELF (Executable and Linkable Format) file, etc.

The loader 210 may create a lightweight executor 230 (step 302), which in one embodiment is a user-mode process that is also referred to as "lightweight executor process." The loader 210 loads the contents of the sample file and other components that the sample file may need to run into the lightweight executor 230 (step 303). For example, the loader 210 may load the instructions of the sample file in the process space of the lightweight executor 230. The loader 210 may also load in the lightweight executor 230 other components, such as dynamic link libraries (DLLs), that the sample file may need to execute. The loader 210 thereafter sets the first instruction address (e.g., entry point of the sample file) to start execution and evaluation of the sample file (step 304).

Figure 4:
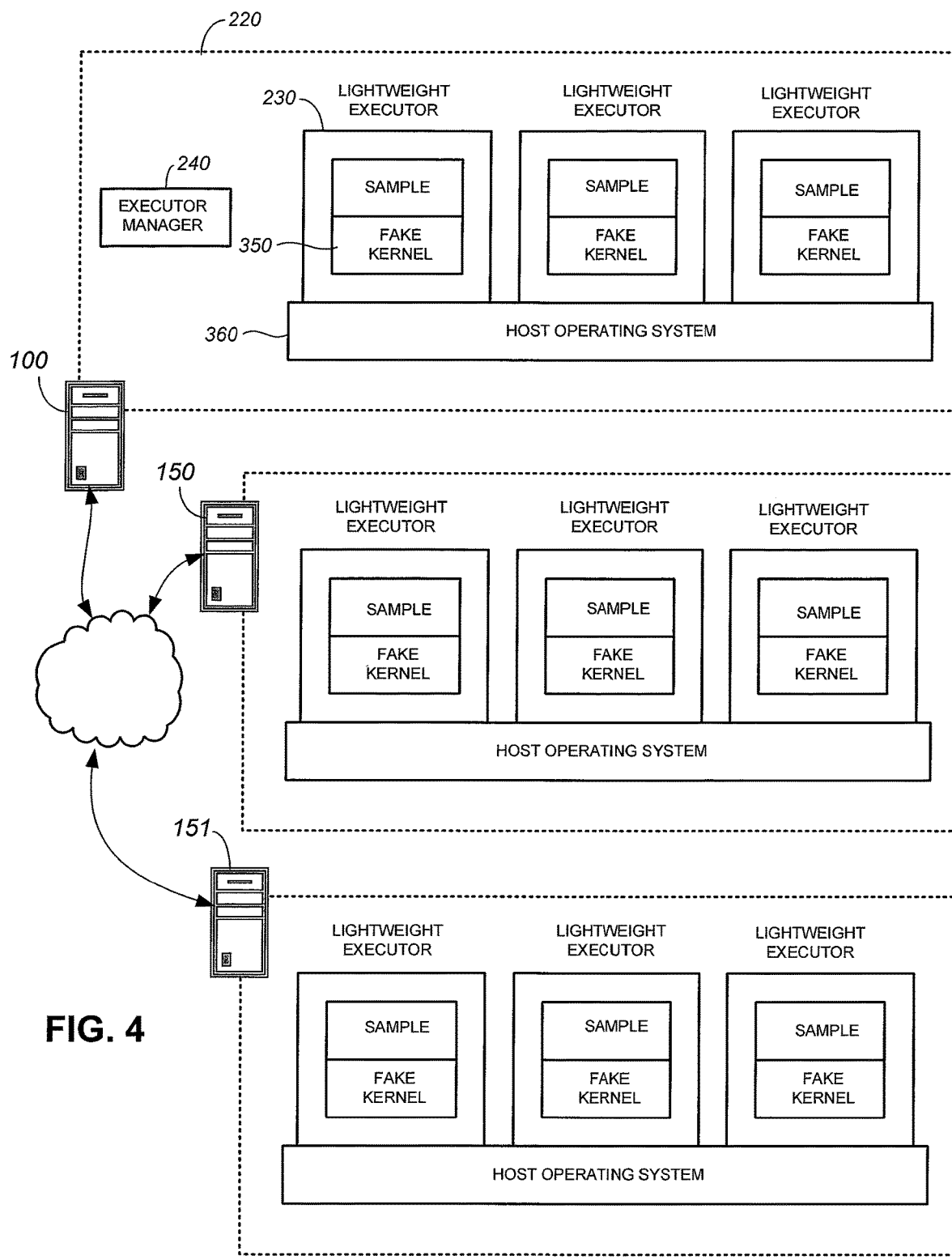
FIG. 4 is a logical diagram of a lightweight executor array in accordance with an embodiment of the present invention.

FIG. 4 is a logical diagram of the lightweight executor array 220 in accordance with an embodiment of the present invention. In the example of FIG. 4, each light executor 230 is a user-mode process running on a host operating system 360 of a host computer. A lightweight executor 230 may include a fake kernel 350 and instructions of a sample file loaded by the loader 210. A fake kernel 350 and instructions of a sample file are in the process space of the corresponding lightweight executor 230. In FIG. 4, not all of the lightweight executors, fake kernels, and host operating systems are labeled with a reference numeral for clarity of illustration.

The fake kernel 350 is so named because it is not a real operating system kernel, i.e., the fake kernel is not an actual kernel of the native operating system of the sample file. Instead, the fake kernel 350 is configured to simply mimic the behavior of the real operating system kernel to make the sample file believe that it is being executed in its expected execution environment. Compared to the real operating system kernel, this makes the fake kernel 350 relatively easy to implement and provides a more secure environment to execute the sample file because there is no risk of infection. Accordingly, the host operating system 360 does not have to be rebooted for each evaluation run.

The fake kernel 350 may be configured to receive system calls and return a response as per the protocol of the real operating system kernel the fake kernel 350 is mimicking, without servicing the system call the way the real operating system kernel would. As a particular example, the fake kernel 350 may receive a WriteFile system call (of the WINDOWS operating system) from the sample file at runtime and return a successful result in response to the system call, without actually performing the write operation or by performing the write operation on a quarantined file or a fake file.

In the example of FIG. 4, the computer system 100 runs the host operating system 360 on which one or more lightweight executors 230 are running. In some embodiments, the lightweight executor array 220 has a distributed architecture. More particularly, the lightweight executors 230 may be distributed among computer systems 100, 150, 151, etc., which may communicate over a computer network, such as over the Internet. An executor manager 240 may be configured to coordinate assignment of sample files to the various lightweight executors 230 in the array for load management and to keep track of which host operating system has which sample file. The evaluation result of individual lightweight executors 230 in the array may be transmitted to a central executor manager 240, which in the example of FIG. 4 is running in the computer system 100.

Figure 5:
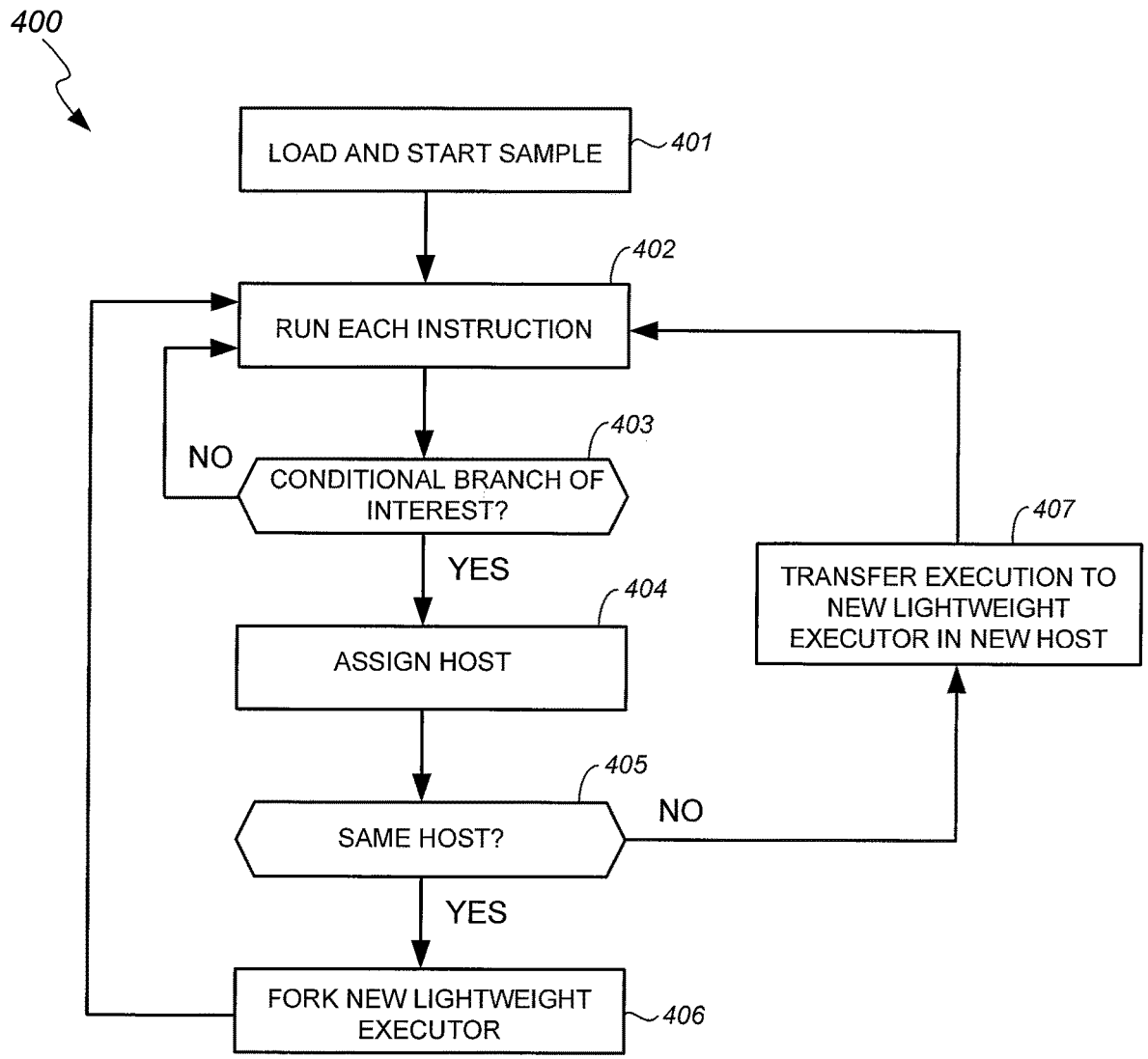
FIG. 5 is a flow diagram of a method of operation of a lightweight executor array in accordance with an embodiment of the present invention.

FIG. 5 is a flow diagram of a method 400 of operation of a lightweight executor array in accordance with an embodiment of the present invention. The method 400 may be employed in the operation of a lightweight executor array 220.

In the example of FIG. 5, the sample file is loaded and started in a lightweight executor 230 (step 401), which in the example of FIG. 5 is a user-mode process running under a host operating system. Instructions in an execution path of the sample file are executed one at a time in sequence (step 402) until a conditional branch instruction of interest is hit during the execution (step 403). In one embodiment, the conditional branch instruction of interest is a conditional branch instruction that the branch filter 250 (shown in FIG. 2) considers to be suspicious, e.g., conditions that are typically used by malware for evasion. Execution of the instructions along the current execution path continues when the conditional branch instruction is not of interest (step 403 to step 402).

When the conditional branch instruction is of interest (step 403 to step 404), the instructions in the next execution path, i.e., the execution path pointed to by the conditional branch instruction of interest, will be evaluated in a new lightweight executor 230. In that case, the executor manager 240 assigns a host operating system on which the new lightweight executor 230 will execute the next execution path (step 404). When the assigned host operating system for the new lightweight executor 230 is the same as the current host operating system, the lightweight executor 230 simply forks a new lightweight executor 230 (step 405 to step 406). Otherwise, when the assigned host operating system for the new lightweight executor 230 is a new host operating system (i.e., different from the current host operating system), the execution of the instructions in the next execution path is transferred to the new lightweight executor 230 in the new host operating system (step 405 to step 407). For example, the execution status of the sample file may be transferred from the current host operating system to the new host operating system, the new lightweight executor 230 is created in the new host operating system, and the current execution status of the sample file is loaded in the new lightweight executor 230.

Figure 6:
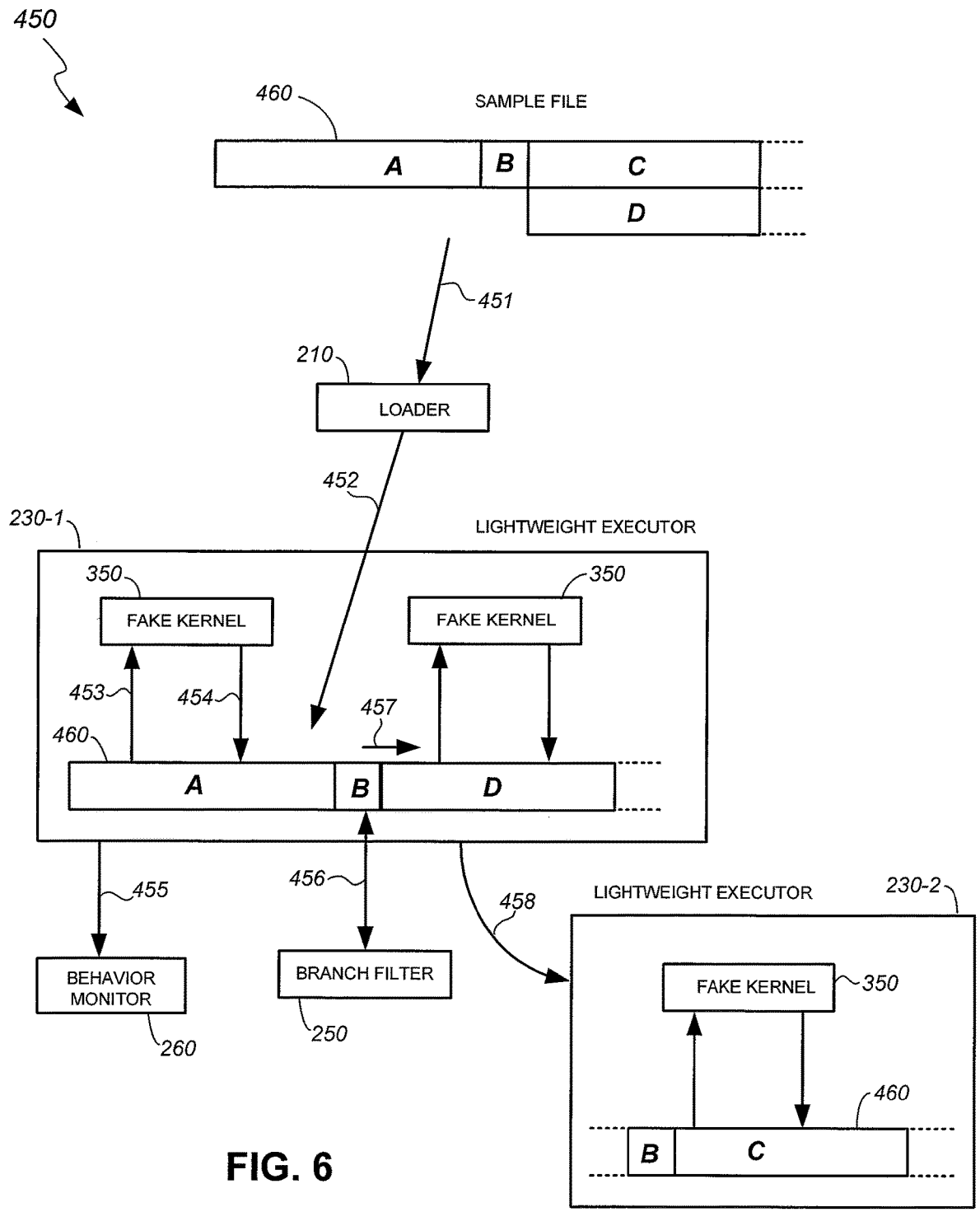
FIG. 6 is a flow diagram of a method of evaluating an executable file for malware in accordance with an embodiment of the present invention.

FIG. 6 is a flow diagram of a method 450 of evaluating an executable file for malware in accordance with an embodiment of the present invention. The method 450 is explained using previously described components for illustration purposes. Other components may also be employed without detracting from the merits of the present invention.

In the example of FIG. 6, a sample file 460 is an executable file being evaluated for malware. The sample file 460 may contain a series of instructions shown in FIG. 6 as a code sequence A, a code sequence C, and a code sequence D. Generally speaking, a sample file 460 may have more code sequences and branch instructions, with each code sequence comprising instructions in an execution path. In the example of FIG. 6, the sample file 460 includes a conditional branch instruction B that transfers execution to the code sequence C when the condition of the conditional branch instruction B is satisfied and to the code sequence D when the condition of the conditional branch instruction B is not satisfied. With some malware with evasion techniques, the condition of the branch instruction B may be difficult to satisfy, thus hiding potential malware behavior in the code sequence C.

In the example of FIG. 6, the loader 210 receives (see arrow 451) and loads (see arrow 452) the sample file 460 in the process space of a lightweight executor 230-1. The instructions of the sample file 460 are executed one by one, starting with the instructions in the code sequence A. The lightweight executor 230-1 steps through the instructions in the code sequence A and redirects system calls to the fake kernel 350, which is also in the process space of the lightweight executor 230-1 (see arrow 453). The fake kernel 350 receives the system calls and responds to the system calls by returning a successful result (see arrow 454), even though the fake kernel 350 does not service the system calls the way a real operating system kernel would. The behavior monitor 260 observes the runtime behavior of the sample file 460 (see arrow 455) to look for behavior indicative of malware.

When the conditional branch instruction B is encountered while traversing the code sequence A, and the condition of the conditional branch instruction B is not satisfied, the lightweight executor 230-1 consults with the branch filter 250 (see arrow 456) to determine whether or not to create a new lightweight executor in which to run the code sequence C. It is to be noted that in this case, running through the code sequence C for evaluation does not depend on whether or not the condition of the conditional branch instruction B is satisfied. Rather, the decision to run through the code sequence C is based on the determination made by the branch filter 250. This advantageously allows for evaluation of malware behavior through execution paths that otherwise may not be traversed.

In one embodiment, when the branch filter 250 determines that the address of the conditional branch instruction B is in the system library space, the branch filter 250 decides that it is not necessary to execute the instructions in the code sequence C. This is because a system library is part of an operating system, not the sample file 460, and is therefore not suspicious. Using the WINDOWS operating system as an example, ntdll.dll, kernel32.dll is system library that a sample file may need to run. The fake kernel 350 may include fake or dummy versions of system libraries, and load them dynamically when called by the sample file. When the address of the conditional branch instruction B is in the system library space, the branch filter 250 informs the lightweight executor 230-1 that the code sequence C does not have to be traversed.

When the address of the of the conditional branch instruction B is not in the system library space, the branch filter 250 examines the condition of the conditional branch instruction B. When the condition of the conditional branch instruction B is suspicious, the branch filter 250 informs the lightweight executor 230-1 that the code sequence C needs to be traversed. In that case, the lightweight executor 230-1 may initiate creation of another lightweight executor in which to run and evaluate the code sequence C. In one embodiment, suspicious conditions include those that depend on the result of API calls that are typically exploited by malware to evade dynamic evaluation (e.g., GetSystemTime function, GetTickCount function). Suspicious conditions may be predetermined based on observed behavior and structure of known malware, and stored for reference by the branch filter 250. As an example, when the condition of the conditional branch instruction B depends on a value returned by a time-related function call, the branch filter 250 informs the lightweight executor 230-1 that the instructions in the code sequence C need to be executed. This is because time-related functions may be used to evade dynamic evaluation by stalling and forcing the evaluation system to timeout.

When the address of the conditional branch instruction B is not in the system library space and the condition of the branch instruction B is not satisfied but is not suspicious, the branch filter 250 decides that it is not necessary to execute the instructions in the code sequence C. Accordingly, the branch filter 250 so informs the lightweight executor 230-1, which does not traverse the code sequence C and instead continues execution to the code sequence D (see arrow 457). In the lightweight executor 230-1, the code sequence D is monitored and its systems calls are serviced as before.

In the case where the branch filter 250 informs the lightweight executor 230-1 that instructions in the code sequence C need to be executed, a lightweight executor 230-2 is created to evaluate the code sequence C. For example, the lightweight executor 230-1 may fork to create the lightweight executor 230-2 (see arrow 458). There, the lightweight executor 230-2 sets the execution start address to the beginning of the code sequence C. The code sequence C is monitored and its systems calls are serviced as before.

Later encountered code sequences are similarly traversed and observed. The dynamic evaluation of the sample file 460 may continue until the end of the sample file or after a predetermined time (e.g., a timeout period).

The behavior monitor 260 may perform a response action in response to detecting that the behavior of the sample file 460 at runtime in any of its corresponding lightweight executors 230 is indicative of malware. The response action may prevent execution of the sample file 460 at a computer, such as by putting the sample file 460 in quarantine, blocking transmission of the sample file 460 over a computer network, deleting the sample file 460, alerting administrators about the sample file 460, entering information about the sample file 460 in a file reputation database, etc.

Figure 7:
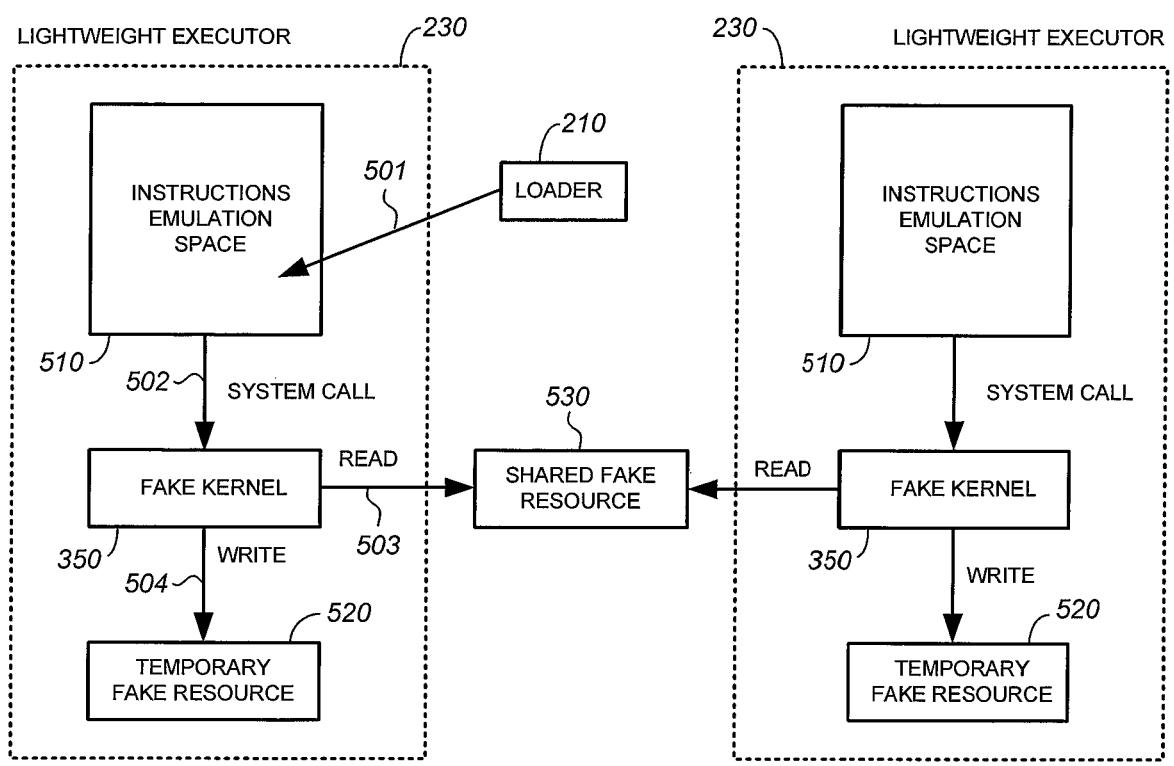
FIG. 7 is a logical diagram of a lightweight executor implemented by software emulation in accordance with an embodiment of the present invention.

FIG. 7 is a logical diagram of a lightweight executor 230 implemented by software emulation in accordance with an embodiment of the present invention. In the example of FIG. 7, a lightweight executor 230 is a user-mode process that executes the instructions of a sample file by software emulation. In the example of FIG. 7, the process space of a lightweight executor 230 may include instructions emulation space 510, a fake kernel 350, and a temporary fake resource 520. In one embodiment, the instructions emulation space 510 is memory space for storing the instructions of the sample file.

The temporary fake resource 520 may comprise memory space that may be used as temporary memory for write operations targeted by the instructions of the sample file. Each lightweight executor 230 has its own temporary fake resource 520, which may be loaded with fake or dummy versions of files or other objects that malware may target. In one embodiment, the temporary fake resource 520 is initialized to a clean state after each evaluation run. This is because the write operations performed by the sample file at runtime may be malicious, i.e., infect its target. However, this does not adversely affect evaluation performance because initialization of the temporary fake resource 520 is relatively quick, as the memory space of the temporary fake resource 520 may simply be released and reallocated.

In the example of FIG. 7, a shared fake resource 530 comprises memory space for storing files or other objects that may be a target of read operations of the instructions of the sample file. The contents of the shared fake resource 530 may vary depending on the native operating system of the sample file. Because read operations are not inherently dangerous and the contents of the shared fake resource 530 may be controlled, the fake resource 530 does not have to be reinitialized before each evaluation run. The shared fake resource 530 may be shared by two or more lightweight executors 230.

In an example operation, a lightweight executor 230 allocates instructions emulation space 510 in the process space of the lightweight executor 230. A loader 210 loads the instructions of the sample file and other components that the sample file may need to run in the instructions emulation space 510 (see arrow 501). The instructions of the sample file are executed one by one in accordance with the software emulation technology employed, e.g., QEMU emulator in user-mode emulation, BOCHS emulator, etc.

Generally speaking, a system call may involve a read operation or a write operation. A read operation includes reading, querying, and opening a system resource, whereas a write operation includes writing and modifying a system resource. The fake kernel 350 receives systems calls (see arrow 502) made by instructions of the sample file. In one embodiment, when the system call is a read operation, the fake kernel 350 performs the read operation on a target (e.g., a file) in the shared fake resource 530 (see arrow 503). When the system call is a write operation, the fake kernel 350 performs the write operation on a target in the temporary fake resource 520 (see arrow 504). The memory space of the temporary fake resource 520 may be released at the end of the evaluation run.

Figure 8:
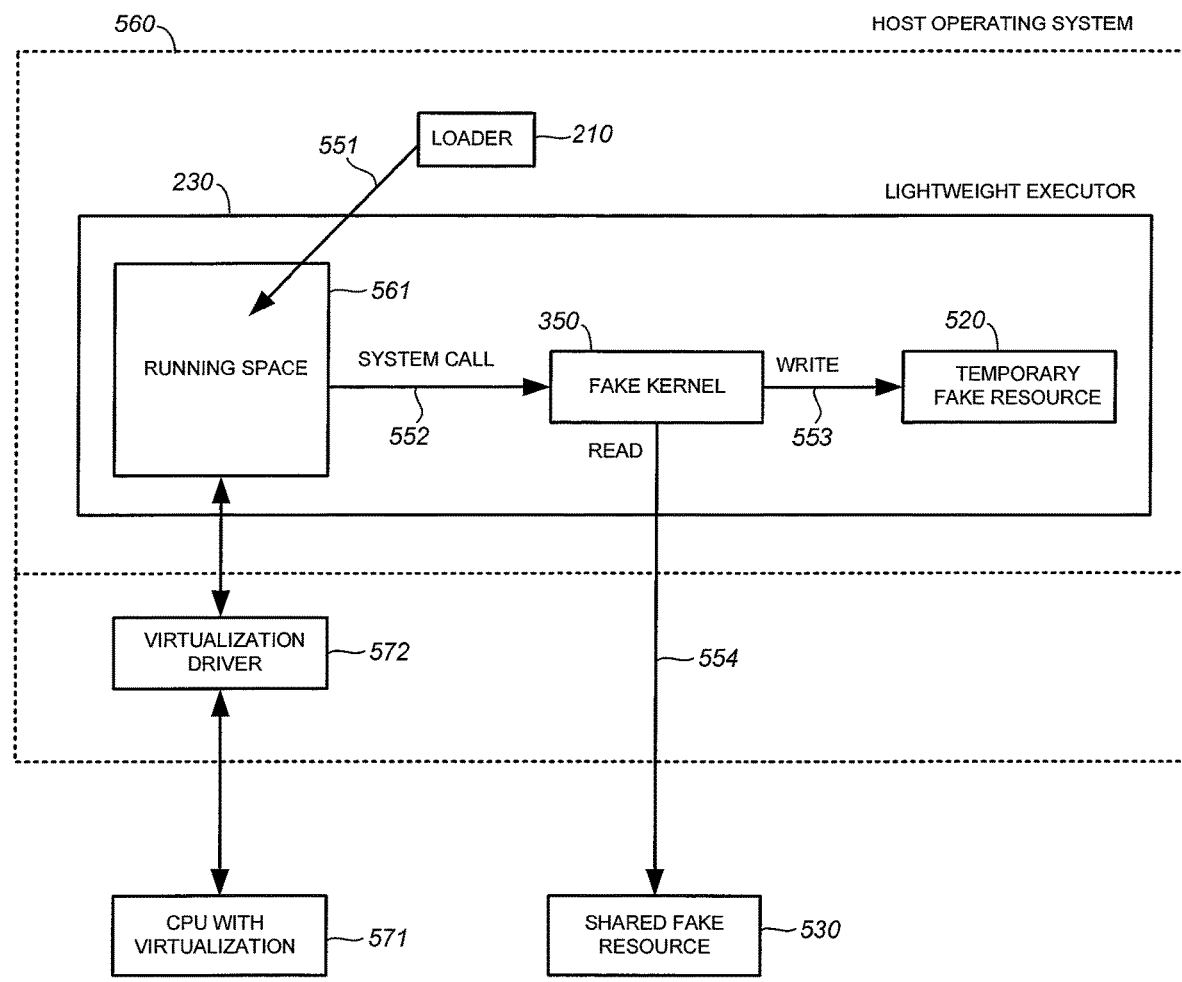
FIG. 8 is a logical diagram of a lightweight executor implemented by CPU hardware virtualization in accordance with an embodiment of the present invention.

FIG. 8 is a logical diagram of a lightweight executor 230 implemented by CPU hardware virtualization in accordance with an embodiment of the present invention. In the example of FIG. 8, a lightweight executor 230 is a user-mode process that executes the instructions of a sample file by CPU hardware virtualization. In the example of FIG. 8, the process space of a lightweight executor 230 may include running space 561, a fake kernel 350, and a temporary fake resource 520.

In the example of FIG. 8, the lightweight executor 230 is a user-mode process running on a host operating 560. The lightweight executor 230 may allocate running space 561 in the process space of the lightweight executor 230. A loader 210 loads the instructions of the sample file and other components that the sample file may need to run in the running space 561 (see arrow 551).

A CPU 571 may be an INTEL CPU that supports CPU hardware virtualization, and a virtualization driver 572 may be a driver of the INTEL KVM virtual machine manager. The lightweight executor 230 may use CPU hardware virtualization capability of the CPU 571 in conjunction with the virtualization driver 572 to create a hardware vCPU, i.e., virtualized CPU. The lightweight executor 230 maps the running space 561 to the vCPU and a controlled interrupt table.

In the example of FIG. 8, the instructions of the sample file are executed one by one by the vCPU in accordance with the CPU hardware virtualization technology, which in this example is the INTEL VT technology. The fake kernel 350 receives systems calls (see 552) made by instructions of the sample file. When the system call is a read operation, the fake kernel 350 performs the read operation on a target (e.g., a file) in the shared fake resource 530 (see arrow 554). When the system call is a write operation, the fake kernel 350 performs the write operation on a target in the temporary fake resource 520 (see arrow 553). The temporary fake resource 520 may be released at the end of the evaluation run.

Dynamic evaluation of executable files for malware in a lightweight executor has been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer comprising a memory and at least one processor, the memory storing instructions that when executed by the at least one processor cause the computer to:
   execute instructions in a first execution path of an executable file;
   receive a system call in a fake kernel during execution of the instructions in the first execution path, wherein the fake kernel mimics operation of a real operating system kernel;
   respond to the system call by returning a successful result from the fake kernel without servicing the system call in a way the real operating system kernel would;
   observe runtime behavior of the executable file during execution of the instructions in the first execution path;
   execute instructions in a second execution path of the executable file; and
   in response to detecting that the executable file comprises malware based on observed runtime behavior of the executable file, prevent subsequent execution of the executable file,
   wherein the instructions in the first execution path are executed in a first user-mode process and the instructions in the second execution path are executed in a second user-mode process, and the first and second user-mode processes are running on different host operating systems.

2. The computer of claim 1, wherein the system call is for a write operation, and the fake kernel returns the successful result without performing the write operation.

3. A computer-implemented method of evaluating an executable file for malware, the method comprising:
   executing instructions in a first execution path of an executable file in a first lightweight executor process;
   receiving a system call in a fake kernel during execution of the instructions in the first execution path, wherein the fake kernel mimics operation of a real operating system kernel;
   returning a response, by the fake kernel, to the system call without servicing the system call in a way the real operating system kernel would;
   observe runtime behavior of the executable file during execution of the instructions in the first execution path;
   execute instructions in a second execution path of the executable file in a second lightweight executor process; and
   in response to detecting that the executable file comprises malware based on observed runtime behavior of the executable file, prevent subsequent execution of the executable file,
   wherein the instructions in the first execution path are executed in a first user-mode process and the instructions in the second execution path are executed in a second user-mode process, and the first and second user-mode processes are running on different host operating systems.

4. The method of claim 3, further comprising:
   detecting a conditional branch instruction in the first execution path, the conditional branch instruction pointing to the second execution path of the executable file,
   wherein the instructions in the second execution path of the executable file are executed in the second lightweight executor process in response to detecting that a condition of the conditional branch instruction is indicative of malware.

5. A computer comprising a memory and at least one processor, the memory storing instructions that when executed by the at least one processor cause the computer to:
   execute instructions in a first execution path of an executable file;
   receive a system call in a fake kernel during execution of the instructions in the first execution path, wherein the fake kernel mimics operation of a real operating system kernel;
   respond to the system call by returning a successful result from the fake kernel without servicing the system call in a way the real operating system kernel would;
   observe runtime behavior of the executable file during execution of the instructions in the first execution path;
   execute instructions in a second execution path of the executable file; and in response to detecting that the executable file comprises malware based on observed runtime behavior of the executable file, prevent subsequent execution of the executable file, wherein the instructions in the first execution path are executed in a first user-mode process and the instructions in the second execution path are executed in a second user-mode process, and the first and second user-mode processes are running on a same host operating system.

6. The computer of claim 5, wherein the system call is for a write operation, and the fake kernel returns the successful result without performing the write operation.

7. A computer-implemented method of evaluating an executable file for malware, the method comprising:

executing instructions in a first execution path of an executable file in a first lightweight executor process;

receiving a system call in a fake kernel during execution of the instructions in the first execution path, wherein the fake kernel mimics operation of a real operating system kernel;

returning a response, by the fake kernel, to the system call without servicing the system call in a way the real operating system kernel would;

observe runtime behavior of the executable file during execution of the instructions in the first execution path;

execute instructions in a second execution path of the executable file in a second lightweight executor process; and in response to detecting that the executable file comprises malware based on observed runtime behavior of the executable file, prevent subsequent execution of the executable file, wherein the instructions in the first execution path are executed in a first user-mode process and the instructions in the second execution path are executed in a second user-mode process, and the first and second user-mode processes are running on a same host operating system.

8. The method of claim 7, further comprising:

detecting a conditional branch instruction in the first execution path, the conditional branch instruction pointing to the second execution path of the executable file, wherein the instructions in the second execution path of the executable file are executed in the second lightweight executor process in response to detecting that a condition of the conditional branch instruction is indicative of malware.

* * * * *